(12) United States Patent
Nucci et al.

(10) Patent No.: US 7,930,424 B1
(45) Date of Patent: Apr. 19, 2011

(54) SYSTEM AND METHOD FOR DETECTING BOGUS BGP ROUTE INFORMATION

(75) Inventors: Antonio Nucci, Burlingame, CA (US); Supranamaya Ranjan, Palo Alto, CA (US); Lixin Gao, Sunnyvale, CA (US); Jian Qiu, Sunnyvale, CA (US)

(73) Assignee: Narus, Inc., Sunnyvale, CA (US)

(*) Notice: Subject to any disclaimer, the term of this patent is extended or adjusted under 35 U.S.C. 154(b) by 614 days.

(21) Appl. No.: 11/746,549

(22) Filed: May 9, 2007

(51) Int. Cl.
G06F 15/173 (2006.01)
(52) U.S. Cl. ...................................................... 709/238
(58) Field of Classification Search .................. 709/224, 709/238
See application file for complete search history.

(56) References Cited

U.S. PATENT DOCUMENTS

| | | | | |
|---|---|---|---|---|
| 6,700,874 | B1* | 3/2004 | Takihiro et al. | 370/248 |
| 6,999,454 | B1* | 2/2006 | Crump | 370/389 |
| 7,584,507 | B1* | 9/2009 | Nucci | 726/23 |
| 2004/0064725 | A1* | 4/2004 | Padmanabhan et al. | 713/201 |
| 2004/0221296 | A1* | 11/2004 | Ogielski et al. | 719/313 |
| 2005/0286412 | A1* | 12/2005 | Hao et al. | 370/216 |
| 2006/0114880 | A1* | 6/2006 | Marce et al. | 370/351 |
| 2006/0184690 | A1* | 8/2006 | Milliken | 709/238 |
| 2007/0153763 | A1* | 7/2007 | Rampolla et al. | 370/351 |
| 2007/0250902 | A1* | 10/2007 | Vaidyanathan | 726/1 |
| 2008/0031257 | A1* | 2/2008 | He | 370/395.31 |
| 2008/0247392 | A1* | 10/2008 | White et al. | 370/392 |
| 2008/0320166 | A1* | 12/2008 | Filsfils et al. | 709/242 |

OTHER PUBLICATIONS

Rekhter, et al., "A Border Gateway Protocol 4 (BGP-4)," Standards Track, Jan. 2006, 93 pgs., Network Working Group.

Stephen A Misel, "North American Network Operators Group," email, Apr. 25, 1997, 2 pgs., http://www.merit.edu/mail.archives/nanog/1997-04/msg00340.html.

Kent, et al., "Secure Border Gateway Protocol(Secure-BGP)," IEEE Journal on Selected Areas in Communications, Apr. 2000, 26 pgs., vol. 18, No. 4.

White, et al., "Architecture and Deployment Considerations for Secure Origin BGP(soBGP)," Jun. 2006, 19 pgs.

Joe St Sauver, "Route Injection and Spam," Messaging Anti-Abuse Working Group 8th General(Members Only) Meeting, Oct. 25, 2006, Totonto, Ontario, Canada.

"Policies for IPv4 address space management in the Asian Pacific region," http://www.apnic.net/docs/policy/add-manage-policy.html, Dec. 13, 2005, 2 pgs.

Woodcock, Bill, "Best Practices in IPv4 Anycase Routing," Aug. 2002, 42 pgs., Packet Clearing House.

(Continued)

*Primary Examiner* — Kevin Bates
*Assistant Examiner* — Jason Recek
(74) *Attorney, Agent, or Firm* — Fernandez & Associates, LLP

(57) ABSTRACT

The present invention relates to a method of detecting invalid border gateway protocol (BGP) route in a network, wherein network traffic is routed based at least on BGP announcements from one or more BGP routers, the method comprising obtaining a plurality of routing information objects from the BGP announcements during an observation window, each routing information object comprising at least one selected from a group consisting of an prefix-origin autonomous system (AS) association and a directed AS-link, identifying a transient routing information object having at least one selected from a group consisting of a up time less than a first pre-determined threshold or a lifespan less than a second pre-determined threshold, defining a valid routing information object set by eliminating the transient routing information object from the plurality of routing information objects, and detecting a BGP route from the BGP announcements as invalid based on the valid routing information object set.

21 Claims, 3 Drawing Sheets

OTHER PUBLICATIONS

"Autonomous System Numbers," Nov. 30, 2006, 3 pgs.
Popescu, et al., "The Anatomy of a Leak: AS9121 or How we Learned to Start Worrying and Hate the Maximum Prefix Limits," May 15, 2005, 37 pgs., Renesys Corpoation.
"CON-ED Steals The 'Net," http://www.renesys.com/blog/2006/01/coned_steals_the_net.shtml, Jan. 2006, 5 pgs., Renesys Blog.
Karlin, et al., "Pretty Good BGP and the Internet Alert Registry," Jun. 5, 2006 10 pgs., University of New Mexico and Princeton University.
Josh Karlin, "North American Network Operators Group," email, Jun. 7, 2006, 1 pg., http://www.merit.edu/mail.archives/nanog/2006-06/msg00082.html.
Vandy Hamidi, "North American Network Operators Group," email, Nov. 19, 2004, 2 pgs., http://www.merit.edu/mail.archives/nanog/2004-11/msg00586.html.
Erik Sundberg, "North American Network Operators Group," email, Dec. 13, 2005, 2 pgs., http://www.merit.edu/mail.archives/nanog/2005-12/msg00219.html.

* cited by examiner

SYSTEM AND METHOD FOR DETECTING BOGUS BGP ROUTE INFORMATION

CROSS-REFERENCE TO RELATED APPLICATIONS

Subject matter contained in the present document may be related to subject matter contained in co-pending U.S. patent application Ser. No. 11/726,755, entitled "Method for Detecting Internet Border Gateway Protocol Prefix Hijacking Attacks,", filed on Mar. 21, 2007 and assigned to the same assignee.

BACKGROUND OF THE INVENTION

1. Field of the Invention

The present invention relates to computers and computer networks. More particularly, the invention relates to detecting an invalid Border Gateway Protocol (BGP) route in the Internet.

2. Background of the Related Art

The Internet routing system is partitioned into tens of thousands of independently administrated Autonomous Systems (ASs). Border Gateway Protocol (BGP) is the de facto inter-domain routing protocol that maintains and exchanges routing information between ASs. However, BGP was designed based on the implicit trust between all participants and does not employ any measures to authenticate the routes injected into or propagated through the system. So, virtually any AS can announce any route into the routing system and sometimes, the bogus routes (i.e., invalid routes) can trigger large-scale anomalies in the Internet. A canonical example happened in 1997 when AS7007 announced prefixes of a large portion of the Internet and interrupted the reachability for hours. Moreover, bogus routes can be used to enable stealthy attacks in the Internet. For instance, spammers can announce an arbitrary prefix briefly and send spam from the hijacked address space, thereby rendering traceback to the spammer much more difficult. Thus, it is important for ISPs to detect any bogus routing information in their routing system in real-time.

Although the destructive effects of bogus routes has raised serious concerns in the Internet operator community, prevention of bogus routes largely relies on ad hoc route filters. Various bogus routes still keep emerging. Meanwhile, although several secured extension of BGP, such as S-BGP and soBGP, have been proposed, their comprehensive deployment is still unforeseeable. Hence, it is imperative to provide a practical system to help network operators identify the bogus routing information and thereby to detect malicious activities associated with them.

SUMMARY

In general, in one aspect, the present invention relates to a method of detecting invalid border gateway protocol (BGP) route in a network, wherein network traffic is routed based at least on BGP announcements from one or more BGP routers, the method comprising obtaining a plurality of routing information objects from the BGP announcements during an observation window, each routing information object comprising at least one selected from a group consisting of an prefix-origin autonomous system (AS) association and a directed AS-link, identifying a transient routing information object having at least one selected from a group consisting of a up time less than a first pre-determined threshold or a lifespan less than a second pre-determined threshold, defining a valid routing information object set by eliminating the transient routing information object from the plurality of routing information objects, and detecting a BGP route from the BGP announcements as invalid based on the valid routing information object set.

In general, in one aspect, the present invention relates to a computer readable medium, embodying instructions executable by the computer to perform method steps for detecting invalid border gateway protocol (BGP) route in a network, wherein network traffic is routed based at least on BGP announcements from one or more BGP routers, the instructions comprising functionality to obtain a plurality of routing information objects from the BGP announcements during an observation window, each routing information object comprising at least one selected from a group consisting of an prefix-origin autonomous system (AS) association and a directed AS-link, identify a transient routing information object having at least one selected from a group consisting of a up time less than a first pre-determined threshold or a lifespan less than a second pre-determined threshold, define a valid routing information object set by eliminating the transient routing information object from the plurality of routing information objects, and detect a BGP route from the BGP announcements as invalid based on the valid routing information object set.

In general, in one aspect, the present invention relates to a system for detecting invalid border gateway protocol (BGP) route in a network, wherein network traffic is routed based at least on BGP announcements from one or more BGP routers, the system comprising a valid BGP routing information object set, a memory comprising a set of instructions, and a processor operatively coupled to the memory, wherein the processor executes the set of instructions to obtain a plurality of routing information objects from the BGP announcements during an observation window, each routing information object comprising at least one selected from a group consisting of an prefix-origin autonomous system (AS) association and a directed AS-link, identify a transient routing information object having at least one selected from a group consisting of a up time less than a first pre-determined threshold or a lifespan less than a second pre-determined threshold, define the valid routing information object set by eliminating the transient routing information object from the plurality of routing information objects, and detect a BGP route from the BGP announcements as invalid based on the valid routing information object set.

Other aspects and advantages of the invention will be apparent from the following description and the appended claims.

DETAILED DESCRIPTION

Figure 1:
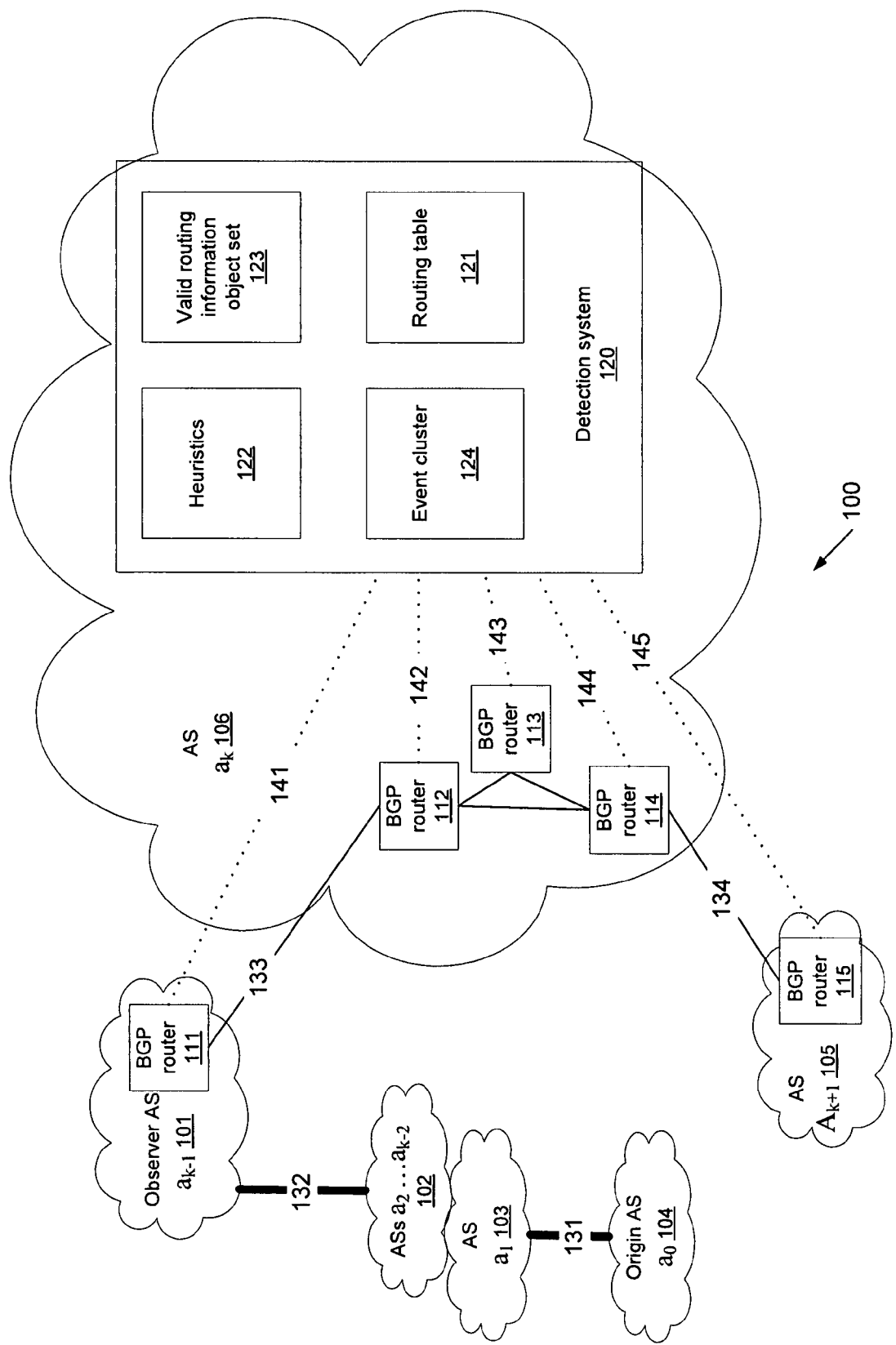
FIG. 1 shows a schematic diagram of a system for detecting invalid BGP routes in the Internet.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

FIG. 1 shows a schematic diagram of a system for detecting invalid BGP routes in the Internet. Here, the Internet is represented by the system 100, which includes multiple administrated autonomous systems, e.g., $a_0$ (104), $a_1$ (103), $a_2$ through $a_{k-2}$ (102), $a_{k-1}$ (101), $a_k$ (106), and $a_{k+1}$ (105). The inter-AS network traffic, e.g., (131)-(134) is routed via the BGP routers, e.g., BGP routers (111)-(115). The detection system (120) is shown, as an example, to reside within AS $a_k$ (106). The detection system (120) peers with the BGP routers (111)-(115) and passively receives routing data, e.g., (141)-(145). As prefix announcements are transmitted within the system (100), the detection system (120) extracts and stores routing information objects from the received route announcements and in parallel examines whether the routes are invalid, or bogus. The route information may be stored in the routing table (121). The extracted routing information objects form the valid routing information object set (123) after applying certain screening process. The screening process may include use of heuristics (122) and event cluster (124).

A BGP route includes a prefix p and an AS path. An exemplary AS path $\{a_k, \ldots, a_0\}$ is shown in FIG. 1 as (104), (103), (102), (101), and (106), where $a_k$ (106) is the observer AS of the AS path and $a_0$ (104) is the origin AS of the AS path. The direction of an AS path is from the observer AS to the origin AS. The BGP announcements propagate in the reverse direction of the AS path. As the detection system (120) receives a BGP route with prefix p and AS path $\{a_k, \ldots, a_0\}$, exemplary routing information objects may be extracted, e.g., (1) prefix-originAS association represented as a tuple (p, $a_0$), (2) directed AS-links, which are directional AS pairs $a_i \rightarrow a_{i-1}$, i=k through 1 with the same direction as the AS path, and (3) prefix-enrouteAS association. In this example, $a_i$ is said to be the upstream of $a_{i-1}$ and $a_{i-1}$ is the downstream of $a_i$.

A prefix-originAS association records the stable relationship between a prefix and an origin AS. A directed AS-link indicates that the two ASs are neighbors and the direction encodes the import/export routing policies of the two ASs from the viewpoint of the observer AS. The downstream AS allows routes to be exported to the upstream AS while the upstream AS imports the routes from the downstream AS. A prefix-enrouteAS association records the stable relationship between a prefix and an en-route AS, which is described in more detail later. Other examples of routing information object may be defined differently.

The detection system (120) maintains a routing table (121) R(t) that stores all routes from its peering BGP routers (e.g., BGP routers (111) and (115)) at time t. R(t) keeps being updated with the routing updates (i.e., BGP announcements) from the peering routers. A routing information object o (e.g., a prefix-originAS association, a directed AS-link, or other routing information objects) exists at time t if there is at least one route in R(t) that includes o. Otherwise, o does not exist. At time t, the extracted prefix-originAS associations and directed AS-links from all the observed BGP announced routes during the observation window with length T, which starts at t-T and ends at t, compose the sets A[t-T,t) and L[t-T, t) of routing information objects, respectively. The validity of an announced BGP route may be determined based on these sets of routing information objects. An exemplary procedure "isBogusRoute" is described in FIG. 3 of the Appendix that verifies the legitimacy (i.e., validity) of a route (p, $\{a_k, \ldots, a_0\}$ based on the sets A[t-T,t) and L[t-T, t) of the routing information objects. In this example, A[t-T,t) and L[t-T, t) is used as initial version of the valid routing information object set (123).

Figure 2:
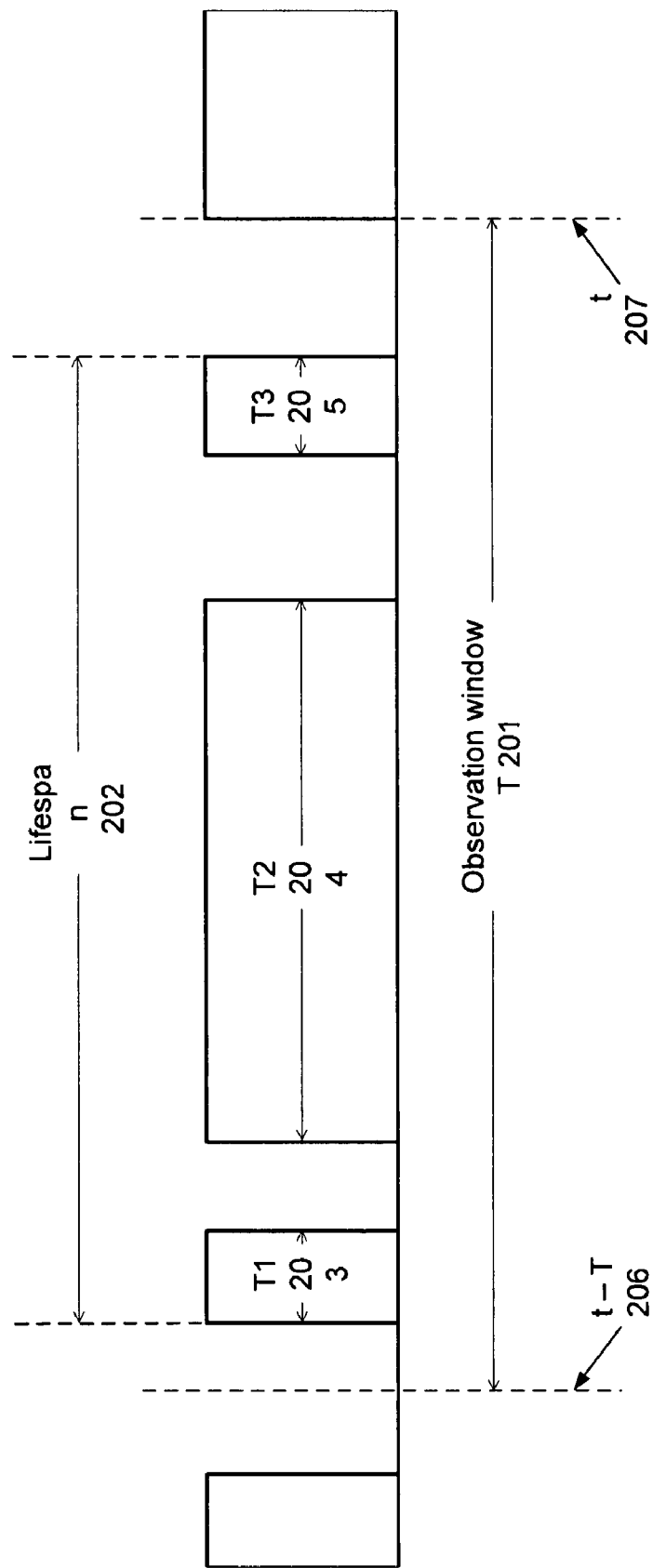
FIG. 2 shows a schematic diagram for detecting transient routing information object.

FIG. 2 shows a schematic diagram for detecting transient routing information object. Transient routing information objects are eliminated from the sets A[t-T,t) and L[t-T, t) to form the valid routing information object set, e.g., the valid routing information object set (123). As described above, the detection system maintains a routing table R(t) that stores all routes from its peering BGP routers at time t. R(t) keeps being updated with the routing updates from the neighboring routers. A routing object o (e.g., prefix-originAS association, directed AS-links, prefix-enrouteAS association, or other routing objects) exists at time t if there is at least one route in R(t) having o. Otherwise, o does not exist. Given an observation window [t-T,t), the accumulative uptime of o, denoted by $u_o$[t-T, t), is the sum of the durations of all the periods that o exists. Further, the lifespan of o during the observation window, denoted by $l_o$[t-T, t), is the time span when o first and last exists in the window. For example, in FIG. 2, during the observation window (201) [t-T, t), which starts at (206) t-T and ends at (207) t, the uptime is the sum of (203), (204), and (205), which may be denoted as u=T1+T2+T3 and the lifespan is the length of the shown interval (202).

Transient routing information object maybe defined as a routing information object with uptime less than a first threshold $\theta_u$ or a lifespan less than a second threshold $\theta_l$ in the observation window [t-T, t). For example, the two criteria may be applied to the prefix-originAS associations and the directed AS-links respectively. As the uptime of a routing information object is always no longer than its lifespan, the uptime criterion is more stringent than that with lifespan. Compared with prefix-originAS associations, directed AS-links have less visibility because the network topology and routing policies can limit the visibility of an AS-link to the observer AS. For example, a multi-homed stub AS announces its prefixes through its primary and backup links alternatively. From the viewpoint of the observer AS, the links show up intermittently while the prefix-originAS associations of the AS appear continuously. Therefore, prefix-originAS associations are more likely persistent over time compared with directed AS-links. In one example, transient routing information objects are define as a prefix-originAS associations with the uptime less than the first threshold $\theta_u$ or directed AS-links with the lifespan less than the second threshold $\theta_l$. The transient routing information objects, thus defined, are eliminated from the sets A[t-T,t) and L[t-T, t) to form modified sets A'[t-T,t) and L'[t-T, t) which compose the valid routing information object set (123). Accordingly, in an alternative example to the procedures in FIG. 3 of the Appendix, the set A[t-T,t) is replaced with the refined set A'[t-T,t)={o|o∈A[t-T, t), $u_o$[t-T, t)>$\theta_u$} and L[t-T,t) is replaced with L'[t-T, t)={o|o∈L[t-T, t), $l_o$[t-T,t)>$\theta_l$}.

By analyzing the behavior of attackers and the common practices in prefixes assignment/allocation and AS peering in the Internet, heuristics are defined to explore those possibly hidden or new routing information objects. For example, the exemplary heuristics described below may be used as supplement of the procedures in FIG. 3 of the Appendix to further qualify the elimination of transient routing information objects. For example, a transient routing information object may be determined to be valid if it meets the description of one or more such heuristic. Accordingly, an announced BGP route relating to this valid transient routing information object is determined to be valid based on the heuristic.

Attacker behavior heuristics are defined as the following. As an attacker announces bogus routes to gain control of address spaces, if the announced route cannot help the attacker achieve the goal, it is not eliminated from the valid routing information object set. Some examples of the attacker behavior heuristics includes Path Extension heuristic and En-route AS heuristic.

Path Extension heuristic is defined as the following. Suppose that the AS path of a prefix p is extended from the origin AS to a new AS, e.g., the AS path changes from {A, B, C} to {A, B, C, D, E}. If the AS path {A, B, C} is determined to be valid, then the extended AS path {A, B, C, D, E} is also determined to be valid, i.e., the routing information objects extracted from the extend AS path is not to be eliminated from the valid routing information object set. More descriptions of the Path Extension heuristic may be found in the Appendix.

En-route AS heuristic is defined as the following. The ASs in the path to a prefix are defined as the en-route ASs of the prefix. An additional type of routing information object is defined as prefix-enrouteAS association, which is a tuple <p, $a_i$> of prefix p and one of its en-route ASs $a_i$. If the lifespan of the routing information object prefix-enrouteAS association is less than a pre-determined threshold $\theta_e$, the directed AS-links including the corresponding en-route AS are determined to be invalid. More descriptions of the En-route AS heuristic may be found in the Appendix.

Common-practice Heuristics are defined as the following. Some examples of the Common-practice Heuristics include Address Expansion Heuristic, Neighboring heuristic, Address Sharing heuristic, and Backbone AS Heuristic.

Address Expansion Heuristic are defined as the following. For an AS and associated prefix of a prefix-originAS association object in the valid routing information object set, an expansion factor $\delta$ may be defined for the AS to expand its existing prefixes to a virtual super-net by $2^\delta$ times. New prefix-originAS associations in the expanded space are determined to belong to the valid routing information object set. More descriptions of the Address Expansion AS heuristic may be found in the Appendix.

Neighboring heuristic are defined as the following. For two neighboring ASs A and B where directed AS-links A→B and B→A belong to the valid routing information object set, if the prefix-originAS association (p, A) belongs to the valid routing information object set, then the prefix-originAS association (p, B) is determined to also belong to the valid routing information object set. More descriptions of the Neighboring heuristic AS heuristic may be found in the Appendix.

Address Sharing heuristic are defined as the following. For two ASs A and B that share their prefixes p and q (i.e., p∩q not equal ∅), if the prefix-originAS association (p, A) belongs to the valid routing information object set, then the prefix-originAS association (p, B) is determined to also belong to the valid routing information object set. More descriptions of the Address Sharing heuristic AS heuristic may be found in the Appendix.

Backbone AS Heuristic are defined as the following. A backbone AS is determined by comparing the in-degree of an AS, i.e., the number of its upstream ASs, to be more than a pre-determined threshold G. Any new directed AS-link from a backbone AS to another AS is included in the valid routing information object set. More descriptions of the Backbone AS heuristic AS heuristic may be found in the Appendix.

Besides the above heuristics, one skilled in the art will appreciate that some other common practice heuristics may be defined for the same purpose.

As described above, a transient routing information object may be determined to be valid if it meets the description of one or more defined heuristic. Accordingly, an announced BGP route relating to this valid transient routing information object is determined to be valid based on the heuristic. In addition, Event-based Clustering and Calibration may be used as supplement to further qualify the determination of transient routing information objects being valid. First, an attacker of an invalid routing information object is determined, e.g., either as the upstream AS of the invalid directed AS-link or the origin AS of the invalid prefix-originAS association detected, e.g., by the exemplary procedure described in FIG. 3 of the Appendix. Then additional routing information objects sharing the same upstream AS or the same origin AS that are announced in a cluster are collected as an event cluster. The event cluster may be used to calibrate the detection system, e.g., routing information objects collected in the event cluster is determined to be invalid even if the heuristics determine them to be valid. In one example, the cluster is defined as routing information objects with corresponding BGP routes announced at time $t_1 \leq t_2 \leq \ldots \leq t_n$, where $t_{i+1} - t_i \leq d$ and $t_n - t_1 \leq D$, i.e., the two consecutive routes spaced out less than a first pre-determined period d and the whole cluster spans less than a second pre-determined period D.

Besides the aforementioned measures, other routing information may be used to improve the quality of the detection results. For example, the system can incorporate a priori knowledge of bogus routes, which can be materialized as manually maintained lists of malicious or legitimate objects, to supervise the detection results. The WHOIS database can also be used as a reference in further investigation. Further, the data plane information related to the suspicious prefixes can also help further identify the malicious routes.

Figure 3:
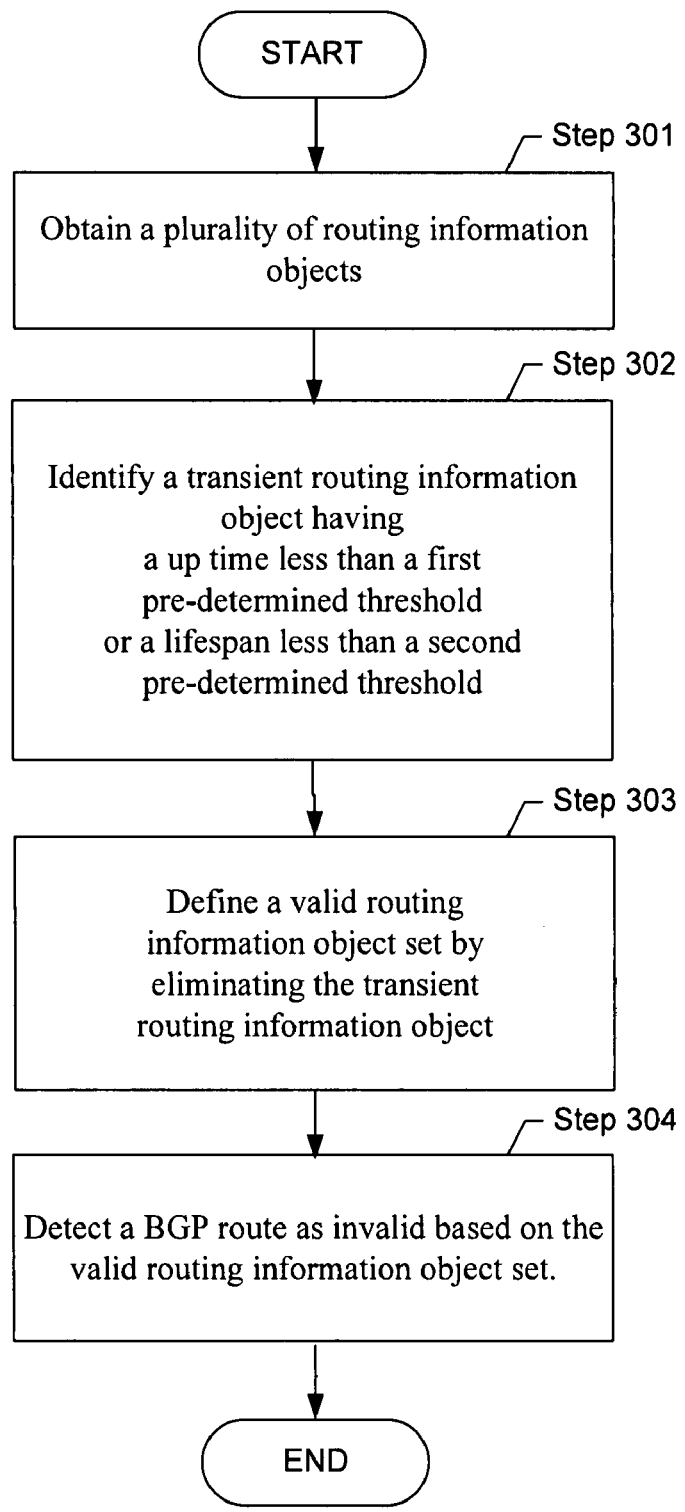
FIG. 3 shows a flow chart of method for detecting invalid BGP routes in the Internet.

FIG. 3 shows a flow chart of method for detecting invalid BGP routes in the Internet. The method may be implemented using a detection system described in reference to FIG. 1 above. Initially, a plurality of routing information objects from the BGP announcements are obtained during an observation window, each routing information object comprising an prefix-origin autonomous system (AS) association or a directed AS-link (step 301). Then, a transient routing information object is identified based on a up time less than a first pre-determined threshold or a lifespan less than a second pre-determined threshold (step 302). A valid routing information object set is defined by eliminating the transient routing information object from the plurality of routing information objects (step 303). Accordingly, a BGP route from the BGP announcements is detected as invalid based on the valid routing information object set (step 304).

It will be understood from the foregoing description that various modifications and changes may be made in the preferred and alternative embodiments of the present invention without departing from its true spirit. For example, the routing information object, the valid routing information object set, the heuristics, and the event cluster may include subset or superset of the examples described, the method may be performed in a different sequence, the components provided may be integrated or separate, the devices included herein may be manually and/or automatically activated to perform the desired operation. The activation (e.g., the interactive configuration of strategies) may be performed as desired and/or based on data generated, conditions detected and/or analysis of results from Internet traffic and/or BGP announcements.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of detecting an invalid border gateway protocol (BGP) route in a plurality of BGP routes linking autonomous systems (ASs) of a network, wherein network traffic is routed based at least on BGP announcements from one or more BGP routers propagating in the plurality of BGP routes, the method comprising:

obtaining a plurality of routing information objects from the BGP announcements;

identifying a transient routing information object having an up time less than a first pre-determined threshold, wherein the transient routing information object represents a prefix and an AS path of the prefix;

defining a valid routing information object set by selectively eliminating the transient routing information object from the plurality of routing information objects, and detecting a BGP route, in the plurality of BGP routes and from the BGP announcements, as invalid based on the valid routing information object set, wherein selectively eliminating the transient routing information object comprises: preventing the transient routing information object from being eliminated when the AS path is identified as an extension of a valid AS path, and wherein the one or more BGP routers comprise hardware.

2. The method of claim 1, wherein selectively eliminating the transient routing information object further comprises:

eliminating the transient routing information object when a lifespan of an association of the prefix and an AS in the AS path is less than a second pre-determined threshold.

3. The method of claim 1, wherein selectively eliminating the transient routing information object further comprises:

preventing the transient routing information object from being eliminated when an association of the prefix and an origin AS in the AS path is within a virtual super-net of a valid prefix-origin AS association, wherein the virtual super-net is identified by expanding a prefix of the valid prefix-origin AS association from an origin AS of the valid prefix-origin AS association based on a pre-determined factor.

4. The method of claim 1, wherein selectively eliminating the transient routing information object further comprises:

preventing the transient routing information object from being eliminated when a directed AS-link formed by an origin AS in the AS path and a neighboring AS of the origin AS belongs to a valid routing information object in the valid routing information object set and when the neighboring AS and the prefix forms a valid prefix-origin AS association.

5. The method of claim 1, wherein selectively eliminating the transient routing information object further comprises:

preventing the transient routing information object from being eliminated by identifying a prefix-origin AS association of the prefix and an origin AS of the AS path as a valid routing information object in the valid routing information object set when another prefix-origin AS association of the prefix and another origin AS of another AS path is identified as another valid routing information object in the valid routing information object set and when the prefix and another prefix of the another origin AS have a non-zero intersection.

6. The method of claim 1, wherein selectively eliminating the transient routing information object further comprises:

preventing the transient routing information object from being eliminated by identifying a directed AS-link formed from a backbone AS to an AS of the AS path as a valid routing information object in the valid routing information object set, wherein the backbone AS is identified based on a number of upstream ASs thereof exceeding a third pre-determined threshold.

7. A non-transitory computer readable medium, embodying instructions executable by a computer to perform method steps for detecting an invalid border gateway protocol (BGP) route in a plurality of BGP routes linking autonomous systems (ASs) of a network, wherein network traffic is routed based at least on BGP announcements from one or more BGP routers propagating in the plurality of BGP routes, the instructions comprising functionality to:

obtain a plurality of routing information objects from the BGP announcements;

identify a transient routing information object having an up time less than a first pre-determined threshold, wherein the transient routing information object represents a prefix and an AS path of the prefix;

define a valid routing information object set by selectively eliminating the transient routing information object from the plurality of routing information objects; and detect a BGP route, in the plurality of BGP routes and from the BGP announcements, as invalid based on the valid routing information object set, wherein selectively eliminating the transient routing information object comprises: eliminating the transient routing information object when a lifespan of an association of the prefix and an AS in the AS path is less than a second pre-determined threshold.

8. The computer readable medium of claim 7, wherein selectively eliminating the transient routing information object further comprises:

preventing the transient routing information object from being eliminated when the AS path is identified as an extension of a valid AS path.

9. The computer readable medium of claim 7, wherein selectively eliminating the transient routing information object further comprises:

preventing the transient routing information object from being eliminated when an association of the prefix and an origin AS in the AS path is within a virtual super-net of a valid prefix-origin AS association, wherein the virtual super-net is identified by expanding a prefix of the valid prefix-origin AS association from an origin AS of the valid prefix-origin AS association based on a pre-determined factor.

10. The computer readable medium of claim 7, wherein selectively eliminating the transient routing information object further comprises:

preventing the transient routing information object from being eliminated when a directed AS-link formed by an origin AS in the AS path and a neighboring AS of the origin AS belongs to a valid routing information object in the valid routing information object set and when the neighboring AS and the prefix forms a valid prefix-origin AS association.

11. The computer readable medium of claim 7, wherein selectively eliminating the transient routing information object further comprises:

preventing the transient routing information object from being eliminated by identifying a prefix-origin AS association of the prefix and an origin AS of the AS path as a valid routing information object in the valid routing information object set when another prefix-origin AS association of the prefix and another origin AS of another AS path is identified as another valid routing information object in the valid routing information object set and when the prefix and another prefix of the another origin AS have a non-zero intersection.

12. The computer readable medium of claim 7, wherein selectively eliminating the transient routing information object further comprises:
preventing the transient routing information object from being eliminated by identifying a directed AS-link formed from a backbone AS to an AS of the AS path as a valid routing information object in the valid routing information object set, wherein the backbone AS is identified based on a number of upstream ASs thereof exceeding a third pre-determined threshold.

13. A system for detecting an invalid border gateway protocol (BGP) route in a plurality of BGP routes linking autonomous systems (ASs) of a network, wherein network traffic is routed based at least on BGP announcements from one or more BGP routers propagating in the plurality of BGP routes, the system comprising:
a valid BGP routing information object set;
a memory comprising a set of instructions; and
a processor operatively coupled to the memory, wherein the processor executes the set of instructions to:
obtain a plurality of routing information objects from the BGP announcements;
identify a transient routing information object having an up time less than a first pre-determined threshold, wherein the transient routing information object represents a prefix and an AS path of the prefix;
define the valid routing information object set by selectively eliminating the transient routing information object from the plurality of routing information objects; and
detect a BGP route, in the plurality of BGP routes and from the BGP announcements, as invalid based on the valid routing information object set,
wherein selectively eliminating the transient routing information object further comprises:
preventing the transient routing information object from being eliminated when an association of the prefix and an origin AS in the AS path is within a virtual super-net of a valid prefix-origin AS association,
wherein the virtual super-net is identified by expanding a prefix of the valid prefix-origin AS association from an origin AS of the valid prefix-origin AS association based on a pre-determined factor.

14. The system of claim 13, wherein selectively eliminating the transient routing information object further comprises:
preventing the transient routing information object from being eliminated when the AS path is identified as an extension of a valid AS path.

15. The system of claim 13, wherein selectively eliminating the transient routing information object further comprises:
eliminating the transient routing information object when a lifespan of an association of the prefix and an AS in the AS path is less than a second pre-determined threshold.

16. The system of claim 13, wherein selectively eliminating the transient routing information object further comprises:
preventing the transient routing information object from being eliminated when a directed AS-link formed by an origin AS in the AS path and a neighboring AS of the origin AS belongs to a valid routing information object in the valid routing information object set and when the neighboring AS and the prefix forms a valid prefix-origin AS association.

17. The system of claim 13, wherein selectively eliminating the transient routing information object further comprises:
preventing the transient routing information object from being eliminated by identifying a prefix-origin AS association of the prefix and an origin AS of the AS path as a valid routing information object in the valid routing information object set when another prefix-origin AS association of the prefix and another origin AS of another AS path is identified as another valid routing information object in the valid routing information object set and when the prefix and another prefix of the another origin AS have a non-zero intersection.

18. The system of claim 13, wherein selectively eliminating the transient routing information object further comprises:
preventing the transient routing information object from being eliminated by identifying a directed AS-link formed from a backbone AS to an AS of the AS path as a valid routing information object in the valid routing information object set, wherein the backbone AS is identified based on a number of upstream ASs thereof exceeding a third pre-determined threshold.

19. A method of detecting an invalid border gateway protocol (BGP) route in a plurality of BGP routes linking autonomous systems (ASs) of a network, wherein network traffic is routed based at least on BGP announcements from one or more BGP routers propagating in the plurality of BGP routes, the method comprising:
obtaining a plurality of routing information objects from the BGP announcement;
identifying a transient routing information object having an up time less than a first pre-determined threshold, wherein the transient routing information object represents a prefix and an AS path of the prefix;
defining a valid routing information object set by selectively eliminating the transient routing information object from the plurality of routing information objects, and
detecting a BGP route, in the plurality of BGP routes and from the BGP announcements, as invalid based on the valid routing information object set,
wherein selectively eliminating the transient routing information object comprises: preventing the transient routing information object from being eliminated when a directed AS-link formed by an origin AS in the AS path and a neighboring AS of the origin AS belongs to a valid routing information object in the valid routing information object set and when the neighboring AS and the prefix forms a valid prefix-origin AS association, and
wherein the one or more BGP routers comprise hardware.

20. A method of detecting an invalid border gateway protocol (BGP) route in a plurality of BGP routes linking autonomous systems (ASs) of a network, wherein network traffic is routed based at least on BGP announcements from one or more BGP routers propagating in the plurality of BGP routes, the method comprising:
including a plurality of routing information objects from the BGP announcement in a valid routing information object set;
identifying a transient routing information object having an up time less than a first pre-determined threshold, wherein the transient routing information object represents a prefix and an AS path of the prefix;

generating an updated valid routing information object set by selectively eliminating the transient routing information object from the valid routing information object set; and detecting a BGP route, in the plurality of BGP routes and from the BGP announcements, as invalid based on the valid routing information object set, wherein selectively eliminating the transient routing information object comprises: preventing the transient routing information object from being eliminated by identifying a prefix-origin AS association of the prefix and an origin AS of the AS path as a valid routing information object in the valid routing information object set when another prefix-origin AS association of the prefix and another origin AS of another AS path is identified as another valid routing information object in the valid routing information object set and when the prefix and another prefix of the another origin AS have a non-zero intersection, and wherein the one or more BGP routers comprise hardware.

21. A method of detecting an invalid border gateway protocol (BGP) route in a plurality of BGP routes linking autonomous systems (ASs) of a network, wherein network traffic is routed based at least on BGP announcements from one or more BGP routers propagating in the plurality of BGP routes, the method comprising:

including a plurality of routing information objects from the BGP announcement in a valid routing information object set;

identifying a transient routing information object having an up time less than a first pre-determined threshold, wherein the transient routing information object represents a prefix and an AS path of the prefix;

generating an updated valid routing information object set by selectively eliminating the transient routing information object from the valid routing information object set; and detecting a BGP route, in the plurality of BGP routes and from the BGP announcements, as invalid based on the updated valid routing information object set, wherein selectively eliminating the transient routing information object comprises: preventing the transient routing information object from being eliminated by identifying a directed AS-link formed from a backbone AS to an AS of the AS path as a valid routing information object in the valid routing information object set, wherein the backbone AS is identified based on a number of upstream ASs thereof exceeding a third pre-determined threshold, and wherein the one or more BGP routers comprise hardware.

* * * * *